United States Patent
Mu et al.

(10) Patent No.: US 11,375,477 B2
(45) Date of Patent: Jun. 28, 2022

(54) METHOD FOR DETERMINING SCRAMBLING INITIALIZATION SEQUENCE OF DATA AND DATA DESCRAMBLING METHOD

(71) Applicant: BEIJING XIAOMI MOBILE SOFTWARE CO., LTD., Beijing (CN)

(72) Inventors: Qin Mu, Beijing (CN); Ming Zhang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 72 days.

(21) Appl. No.: 17/075,623

(22) Filed: Oct. 20, 2020

(65) Prior Publication Data

US 2021/0037504 A1    Feb. 4, 2021

Related U.S. Application Data

(63) Continuation of application No. PCT/CN2018/084919, filed on Apr. 27, 2018.

(51) Int. Cl.
H04W 72/02 (2009.01)
H04J 99/00 (2009.01)
H04W 72/04 (2009.01)

(52) U.S. Cl.
CPC .............. *H04W 72/02* (2013.01); *H04J 15/00* (2013.01); *H04W 72/0446* (2013.01); *H04W 72/0453* (2013.01)

(58) Field of Classification Search
None
See application file for complete search history.

(56) References Cited

U.S. PATENT DOCUMENTS 9,585,136 B2    2/2017 Nam et al.
2010/0323709 A1  12/2010 Nam
(Continued)

FOREIGN PATENT DOCUMENTS

CN    102238575 A    11/2011
CN    102484550 A    5/2012
(Continued)

OTHER PUBLICATIONS

Intel Corporation: "Grant-free UL transmissions in NR", 3GPP Draft: R1-1609499 Grant-Free NOMA,3rd Generation Partnership Project (3GPP), Mobile Competence Centre ; 650. Route Dfslucioles ; F-06921 Sophia-Antipolis Cedex ; FRANCE,vol. RAN WG1, No. Lisbon, Portugal;Oct. 10, 2016-Oct. 14, 2016 Oct. 1, 2016 (Oct. 1, 2016), XP051159569, Retrieved from the Internet:RL:http://www.3gpp.org/ftp/tsg_ran/WG1 RL1/TSGR1 86b/ Docs/ [retrieved on Oct. 1, 2016] p. 4-p. 7.
(Continued)

*Primary Examiner* — Walter J Divito
(74) *Attorney, Agent, or Firm* — Syncoda LLC; Feng Ma

(57) ABSTRACT

A library of reference signal ports, a library of reuse factor identifications (ID) for Non-Orthogonal Multiple Access (NOMA), and a library of time-frequency resources broadcast by a base station (BS) can be received by user equipment (UE). A time-frequency resource in the library of time-frequency resources, a reuse factor ID in the library of reuse factor IDs, and a reference signal port in the library of reference signal ports can be selected. An initial sequence acquired by scrambling uplink data to be transmitted to the BS on the time-frequency resource is determined according to at least one of the reuse factor ID selected or the reference signal port selected, as well as a first numbering corresponding to a cell where the UE camps.

20 Claims, 22 Drawing Sheets

---

S11, a library of reference signal ports, a library of reuse factor identifications (ID) for Non-Orthogonal Multiple Access (NOMA), and a library of time-frequency resources broadcast by a base station (BS) are received

↓

S12, a time-frequency resource in the library of time-frequency resources is selected. A reuse factor ID in the library of reuse factor IDs is selected. A reference signal port in the library of reference signal ports is selected

↓

S13, an initial sequence acquired by scrambling uplink data to be transmitted to the BS on the time-frequency resource is determined according to at least one of the reuse factor ID selected or the reference signal port selected, as well as a first numbering corresponding to a cell where the UE camps

(56) References Cited

U.S. PATENT DOCUMENTS

| | | | |
|---|---|---|---|
| 2012/0327891 A1 | 12/2012 | Nam | |
| 2013/0194931 A1 | 8/2013 | Lee et al. | |
| 2015/0036625 A1 | 2/2015 | Nam et al. | |
| 2019/0245640 A1* | 8/2019 | Yoshimoto | H04W 74/08 |
| 2021/0083828 A1* | 3/2021 | Matsuda | H04W 72/042 |

FOREIGN PATENT DOCUMENTS

| | | | |
|---|---|---|---|
| CN | 103354533 | A | 10/2013 |
| CN | 103384163 | A | 11/2013 |
| CN | 104244459 | A | 12/2014 |
| CN | 104322083 | A | 1/2015 |
| CN | 104798400 | A | 7/2015 |
| CN | 105515608 | A | 4/2016 |
| WO | 2017164698 | A1 | 9/2017 |
| WO | 2018032014 | A1 | 2/2018 |

OTHER PUBLICATIONS

Samsung: "Transmitter side signal processing schemes for NoMA", 3GPP Draft; R1-1804396, 3rd Generation Partnership Project (3GPP) Mobile Competence Centre; 650, Route Deslucioles; F-06921 Sophia-Antipolis Cedex ; FRANCE, vol. RAN WG1, No. Sanya, China; Apr. 16, 2018-Apr. 20, 2018 Apr. 15, 2018 (Apr. 15, 2018), XP051426681,Retrieved from the Internet:URL:http://www.3qpp.org/ftp/Meetings%5F3GPP%5FSYNC/RAN1/Docs/ [retrieved on Apr. 15, 2018] p. 2, paragraph 2.2.

Supplementary European Search Report in the European application No. 18916323.1, dated Nov. 2, 2021.

Office Action of the Indian application No. 202027050747, dated Dec. 10, 2021.

International Search Report in the international application No. PCT/CN2018/084919, dated Feb. 2, 2019.

First Office Action of the Chinese application No. 201880000657.4, dated Apr. 28, 2019.

Notice of Allowance of the Chinese application No. 201880000657.4, dated Sep. 29, 2019.

3GPP TS 38.211 V15.5.0 (Mar. 2019), 3rd Generation Partnership Project; Technical Specification Group Radio Access Network; NR; Physical channels and modulation (Release 15).

3GPP TS 36.211 V15.5.0 (Mar. 2019), 3rd Generation Partnership Project; Technical Specification Group Radio Access Network; Evolved Universal Terrestrial Radio Access (E-UTRA); Physical channels and modulation (Release 15).

English translation of the Written Opinion of the International Search Authority in the international application No. PCT/CN2018/084919, dated Feb. 2, 2019.

* cited by examiner

S133, a third numbering corresponding to the reference signal port selected may be determined S134, the initial sequence acquired by scrambling the uplink data to be transmitted to the BS on the time-frequency resource may be determined according to the first numbering and the third numbering corresponding to the reference signal port selected

FIG. 4

S735, a pre-stored third association between the fourth numbering and the combination may be searched for the fourth numbering corresponding to the combination S736, the initial sequence acquired by scrambling the data may be unscrambled according to the first numbering and the fourth numbering

METHOD FOR DETERMINING SCRAMBLING INITIALIZATION SEQUENCE OF DATA AND DATA DESCRAMBLING METHOD

CROSS-REFERENCE TO RELATED APPLICATION

This application is a continuation of International Application No. PCT/CN2018/084919 filed on Apr. 27, 2018, the disclosure of which is hereby incorporated by reference in its entirely.

BACKGROUND

When User Equipment (UE) in a non-connected state is to enter a connected state, the UE may have to initiate random access to a base station (BS). Accordingly, The BS may allocate an uplink resource to the user to allow the UE to perform uplink transmission through the uplink resource.

SUMMARY

This disclosure relates generally to the field of communications, and more specifically to a method and device for determining an initial sequence acquired by scrambling data, a method and device for unscrambling data, electronic equipment, and a computer readable storage medium.

Various embodiments disclosed herein provide a method and device for determining an initial sequence acquired by scrambling data, a method and device for unscrambling data, electronic equipment, and a computer readable storage medium.

In an aspect, a method for determining an initial sequence acquired by scrambling data is applicable to User Equipment (UE). The method includes:

receiving a library of reference signal ports, a library of reuse factor identifications (ID) for Non-Orthogonal Multiple Access (NOMA), and a library of time-frequency resources broadcast by a base station (BS);

selecting a time-frequency resource in the library of time-frequency resources, selecting a reuse factor ID in the library of reuse factor IDs, and selecting a reference signal port in the library of reference signal ports; and determining, according to at least one of the reuse factor ID selected or the reference signal port selected, as well as a first numbering corresponding to a cell where the UE camps, an initial sequence acquired by scrambling uplink data to be transmitted to the BS on the time-frequency resource.

In another aspect, a method for unscrambling data includes:

broadcasting a library of time-frequency resources, a library of reuse factor identifications (ID) for Non-Orthogonal Multiple Access (NOMA), and a library of reference signal ports;

receiving an initial sequence acquired by scrambling data sent by User Equipment (UE); and unscrambling, according to at least one of a reuse factor ID in the library of reuse factor IDs or a reference signal port in the library of reference signal ports, as well as a first numbering corresponding to a cell where the UE camps, the initial sequence acquired by scrambling the data.

In another aspect, User Equipment (UE) includes a processor and memory.

The memory is adapted to storing an instruction executable by the processor.

The processor is adapted to implementing a step of a method for determining an initial sequence acquired by scrambling data according to any aforementioned embodiment.

In another aspect, electronic equipment includes a processor and memory.

The memory is adapted to storing an instruction executable by the processor.

The processor is adapted to implementing a step of a method for unscrambling data according to any aforementioned embodiment.

In another aspect, a non-transitory computer-readable storage medium has stored thereon a computer program which, when executed by a processor, implements a step of a method for determining an initial sequence acquired by scrambling data according to any aforementioned embodiment.

In another aspect, a non-transitory computer-readable storage medium has stored thereon a computer program which, when executed by a processor, implements a step of a method for unscrambling data according to any aforementioned embodiment.

It is to be understood that both the foregoing general description and the following detailed description are exemplary and explanatory only and are not restrictive of the disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

FIG. 4 is a flowchart of determining an initial sequence acquired by scrambling uplink data to be transmitted to a BS on a time-frequency resource according to some embodiments of the present disclosure.

DETAILED DESCRIPTION

Figure 1:
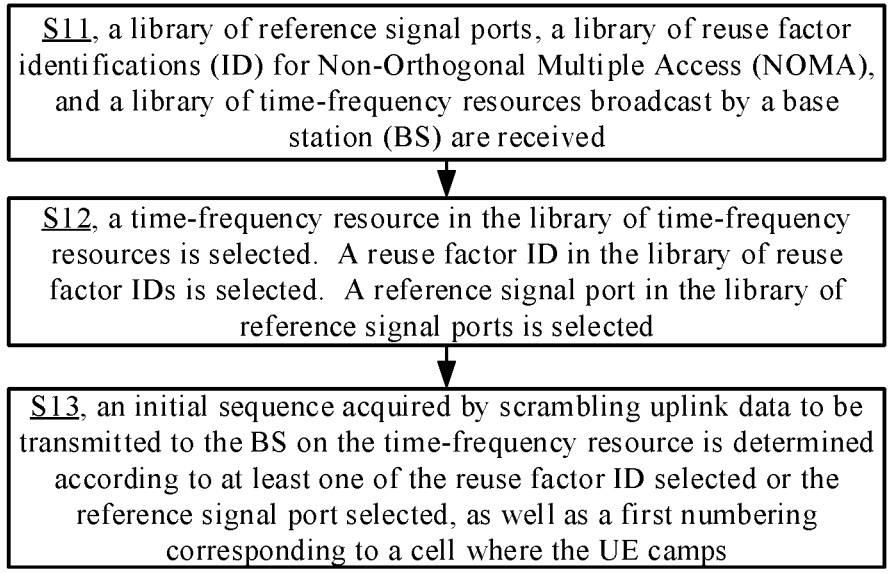
FIG. 1 is a flowchart of a method for determining an initial sequence acquired by scrambling data according to some embodiments of the present disclosure.

Exemplary embodiments (examples of which are illustrated in the accompanying drawings) are elaborated below. The following description refers to the accompanying drawings, in which identical or similar elements in two drawings are denoted by identical reference numerals unless indicated otherwise. The exemplary implementation modes may take on multiple forms, and should not be taken as being limited to examples illustrated herein. Instead, by providing such implementation modes, embodiments herein may become more comprehensive and complete, and comprehensive concept of the exemplary implementation modes may be delivered to those skilled in the art. Implementations set forth in the following exemplary embodiments do not represent all implementations in accordance with the subject disclosure. Rather, they are merely examples of the apparatus and method in accordance with certain aspects herein as recited in the accompanying claims.

To randomize interference, uplink data to be transmitted uplink for a user may have to be scrambled. In related art, an initial sequence for scrambling the uplink data may be determined according to a sub-frame corresponding to the uplink data, a cell numbering, and a Radio Network Temporary Identifier (RNTI) of a cell where UE camps. The RNTI may be configured by a BS for the UE during random access.

Under some circumstances, UE may switch frequently between a non-connected state and a connected state, every time with a little uplink content transmitted. Major overhead will be caused if a user performs random access every time before communicating with a BS. To lower overhead, authorization-free uplink scheduling is proposed in related art. When UE in a non-connected state is to enter a connected state, the UE may perform uplink transmission on a preconfigured resource, without having to perform random access and receive uplink scheduling.

However, based on authorization-free uplink scheduling, UE does not have to initiate random access. Consequently, a BS configures no RNTI for UE. Therefore, the UE cannot scramble uplink data to be transmitted.

FIG. 1 is a flowchart of a method for determining an initial sequence acquired by scrambling data according to some embodiments of the present disclosure. The method here may be applied to UE, such as equipment capable of communicating with a BS, such as a mobile phone, a tablet computer, etc.

As shown in FIG. 1, the method for determining an initial sequence acquired by scrambling data includes a step as follows.

In S11, a library of reference signal ports, a library of reuse factor identifications (ID) for Non-Orthogonal Multiple Access (NOMA), and a library of time-frequency resources broadcast by a base station (BS) are received.

UE may communicate with a BS based on authorization-free uplink scheduling and NOMA. Under such circumstances, the BS may broadcast a library of time-frequency resources, a library of reuse factor (such as a power rating, an interleaver, a spreading code, etc.) IDs for NOMA, and a library of reference signal ports.

In S12, a time-frequency resource in the library of time-frequency resources is selected. A reuse factor ID in the library of reuse factor IDs is selected. A reference signal port in the library of reference signal ports is selected.

A library of time-frequency resources may include a plurality of time-frequency resources. A library of reuse factor IDs for NOMA may include a plurality of reuse factor IDs for NOMA. A library of reference signal ports may include a plurality of reference signal ports. UE may select a time-frequency resource in the library of time-frequency resources. The UE may select a reuse factor ID in the library of reuse factor IDs for NOMA. The UE may select a reference signal port in the library of reference signal ports. Such a selecting operation may be performed randomly, or as instructed by a BS.

In S13, an initial sequence acquired by scrambling uplink data to be transmitted to the BS on the time-frequency resource may be determined according to at least one of the reuse factor ID selected or the reference signal port selected, as well as a first numbering corresponding to a cell where the UE camps.

The scrambled initial sequence may be determined according to but the reuse factor ID selected and the first numbering. In some embodiments, the scrambled initial sequence may be determined according to but the reference signal port selected and the first numbering. In some embodiments, the scrambled initial sequence may be determined according to the reuse factor ID selected and the reference signal port selected, as well as the first numbering.

An initial sequence acquired by scrambling data may be acquired. Then, the initial sequence acquired by scrambling the data may be transmitted uplink to a BS on a time-frequency resource selected according to a reuse factor (such as a power rating) corresponding to a reuse factor ID selected and a reference signal port selected.

A user may acquire, in content broadcast by a BS, a reuse factor ID and a reference signal port. UE may learn a first numbering corresponding to a cell where the UE camps upon accessing the cell. Accordingly, an initial sequence acquired by scrambling data may be determined according to the reuse factor ID and/or the reference signal port, as well as the first numbering. The initial sequence acquired by scrambling the data may be determined successfully even if no RNTI is acquired, implementing uplink data scrambling.

Figure 2:
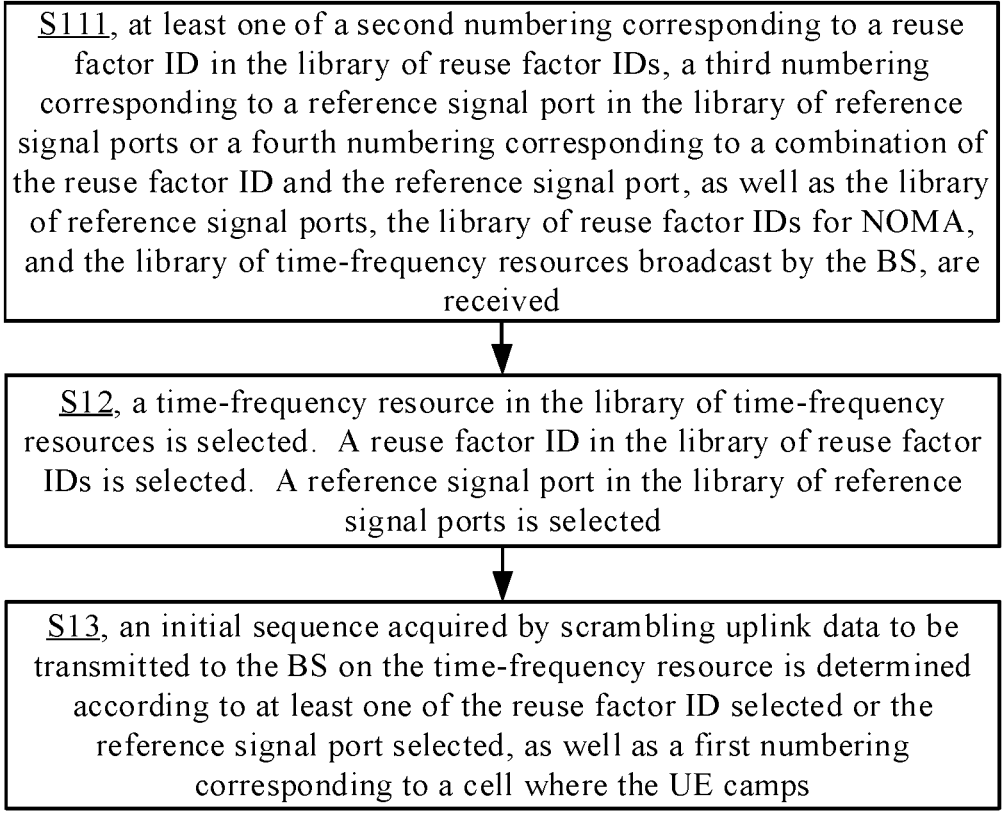
FIG. 2 is a flowchart of receiving a library of reference signal ports, a library of reuse factor identifications (ID) for Non-Orthogonal Multiple Access (NOMA), and a library of time-frequency resources broadcast by a base station (BS) according to some embodiments of the present disclosure.

FIG. 2 is a flowchart of receiving a library of reference signal ports, a library of reuse factor identifications (ID) for Non-Orthogonal Multiple Access (NOMA), and a library of time-frequency resources broadcast by a base station (BS) according to some embodiments of the present disclosure.

As shown in FIG. 2, based on the embodiment shown in FIG. 1, the library of reference signal ports, the library of reuse factor IDs for NOMA, and the library of time-frequency resources broadcast by the BS may be received as follows.

In S111, at least one of a second numbering corresponding to a reuse factor ID in the library of reuse factor IDs, a third numbering corresponding to a reference signal port in the library of reference signal ports or a fourth numbering corresponding to a combination of the reuse factor ID and the reference signal port, as well as the library of reference signal ports, the library of reuse factor IDs for NOMA, and the library of time-frequency resources broadcast by the BS, may be received.

UE may determine the scrambled initial sequence according to but the reuse factor ID selected and the first numbering. Then, in addition to the library of reference signal ports, the library of reuse factor IDs for NOMA, and the library of time-frequency resources broadcast by the BS, the UE may further receive a second numbering corresponding to a reuse factor ID in the library of reuse factor IDs.

UE may determine the scrambled initial sequence according to but the reference signal port selected and the first numbering. Then, in addition to the library of reference signal ports, the library of reuse factor IDs for NOMA, and the library of time-frequency resources broadcast by the BS, the UE may further receive a third numbering corresponding to a reference signal port in the library of reference signal ports.

UE may determine the scrambled initial sequence according to the reuse factor ID selected and the reference signal port selected, as well as the first numbering. Then, in addition to the library of reference signal ports, the library of reuse factor IDs for NOMA, and the library of time-frequency resources broadcast by the BS, the UE may further receive a fourth numbering corresponding to a combination of a reuse factor ID and a reference signal port.

An initial sequence acquired by scrambling data may have to be determined by performing a mathematical operation. However, neither a reuse factor ID nor a reference signal port is numeral. It may be difficult to perform a mathematical operation directly according to reuse factor ID and/or a reference signal port.

Therefore, a BS may configure a distinct numbering for a parameter used in a mathematical operation UE performs in determining an initial sequence acquired by scrambling data. For example, the UE may determine the scrambled initial sequence according to but a reuse factor ID selected and the first numbering. Then, the BS may configure a second numbering for a reuse factor ID. For example, the UE may determine the scrambled initial sequence according to but a reference signal port selected and the first numbering. Then, the BS may configure a third numbering for a reference signal port. For example, the UE may determine the scrambled initial sequence according to a reuse factor ID selected and a reference signal port selected, as well as the first numbering. Then, the BS may configure a fourth numbering for a combination of a reuse factor ID and a reference signal port.

As a numbering configured by the BS is numeral, a mathematical operation may be performed based on the numeral, simplifying computation in determining an initial sequence acquired by scrambling data.

Figure 3:
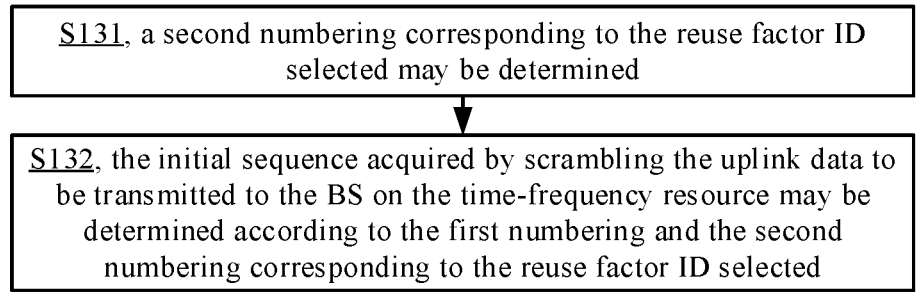
FIG. 3 is a flowchart of determining an initial sequence acquired by scrambling uplink data to be transmitted to a BS on a time-frequency resource according to some embodiments of the present disclosure.

FIG. 3 is a flowchart of determining an initial sequence acquired by scrambling uplink data to be transmitted to a BS on a time-frequency resource according to some embodiments of the present disclosure.

As shown in FIG. 3, based on the embodiment shown in FIG. 2, in case the second numbering is received, the initial sequence acquired by scrambling the uplink data to be transmitted to the BS on the time-frequency resource may be determined according to at least one of the reuse factor ID selected or the reference signal port selected, as well as the first numbering corresponding to the cell where the UE camps, as follows.

In S131, a second numbering corresponding to the reuse factor ID selected may be determined.

In S132, the initial sequence acquired by scrambling the uplink data to be transmitted to the BS on the time-frequency resource may be determined according to the first numbering and the second numbering corresponding to the reuse factor ID selected.

UE may decide to receive the second numbering, as configured by a BS or a user of the UE. In case the UE decides to receive the second numbering, in addition to a library of time-frequency resources, a library of reuse factor IDs, and a library of reference signal ports in content broadcast by a BS, the UE may receive only a second numbering corresponding to a reuse factor ID, but no third numbering nor fourth numbering, thereby reducing resources consumed for receiving information.

A first association between a second numbering and a reuse factor ID may be configured by a BS. In addition, the first association may be sent to UE in advance. Accordingly, the UE may determine, according to the first association, a second numbering corresponding to a reuse factor ID selected.

Thus, a reuse factor ID may be selected. A second numbering corresponding to the reuse factor ID selected may be determined. Then, an initial sequence $c_{init}$, $c_{init}=n_{signature}\times 2^{15}+N_{ID}^{cell}$, acquired by scrambling uplink initial data to be transmitted, may be determined according to the second numbering signature and the first numbering $N_{ID}^{cell}$.

FIG. 4 is a flowchart of determining an initial sequence acquired by scrambling uplink data to be transmitted to a BS on a time-frequency resource according to some embodiments of the present disclosure.

As shown in FIG. 4, based on the embodiment shown in FIG. 2, in case the third numbering is to be received, the initial sequence acquired by scrambling the uplink data to be transmitted to the BS on the time-frequency resource may be determined according to at least one of the reuse factor ID selected or the reference signal port selected, as well as the first numbering corresponding to the cell where the UE camps, as follows.

In S133, a third numbering corresponding to the reference signal port selected may be determined.

In S134, the initial sequence acquired by scrambling the uplink data to be transmitted to the BS on the time-frequency resource may be determined according to the first numbering and the third numbering corresponding to the reference signal port selected.

UE may decide to receive a third numbering, as configured by a BS or a user of the UE. In case the UE decides to receive the third numbering, in addition to a library of time-frequency resources, a library of reuse factor IDs, and a library of reference signal ports in content broadcast by a BS, the UE may receive only a third numbering corresponding to a reference signal port, but no second numbering nor fourth numbering, thereby reducing resources consumed for receiving information.

A second association between a third numbering and a reference signal port, may be configured by a BS. In addition, the second association may be sent to UE in advance. Accordingly, the UE may determine, according to the second association, a third numbering corresponding to a reference signal port selected.

Thus, a reference signal port may be selected. A third numbering corresponding to the reference signal port selected may be determined. Then, an initial sequence $c_{init}$, $c_{init}=n_{RS\text{-}port} \times 2^{15} + N_{ID}^{cell}$, acquired by scrambling uplink data to be transmitted, may be determined according to the third numbering nRS-port and the first numbering $N_{ID}^{cell}$.

Figure 5:
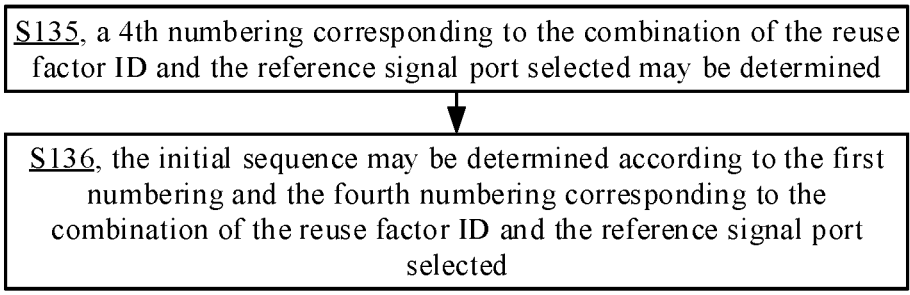
FIG. 5 is a flowchart of determining an initial sequence acquired by scrambling uplink data to be transmitted to a BS on a time-frequency resource according to some embodiments of the present disclosure.

FIG. 5 is a flowchart of determining an initial sequence acquired by scrambling uplink data to be transmitted to a BS on a time-frequency resource according to some embodiments of the present disclosure.

As shown in FIG. 5, based on the embodiment shown in FIG. 2, in case the fourth numbering is received, the initial sequence acquired by scrambling the uplink data to be transmitted to the BS on the time-frequency resource may be determined according to at least one of the reuse factor ID selected or the reference signal port selected, as well as the first numbering corresponding to the cell where the UE camps, as follows.

In S135, a fourth numbering corresponding to the combination of the reuse factor ID selected and the reference signal port selected may be determined.

In S136, the initial sequence acquired by scrambling the uplink data to be transmitted to the BS on the time-frequency resource may be determined according to the first numbering and the fourth numbering corresponding to the combination of the reuse factor ID selected and the reference signal port selected.

UE may decide to receive the fourth numbering, as configured by a BS or a user of the UE. In case the UE decides to receive the fourth numbering, in addition to a library of time-frequency resources, a library of reuse factor IDs, and a library of reference signal ports in content broadcast by a BS, the UE may receive only a fourth numbering corresponding to a combination of a reuse factor ID selected and a reference signal port selected, but no second numbering nor third numbering, thereby reducing resources consumed for receiving information.

A third association between a fourth numbering and a combination of a reuse factor ID and a reference signal port may be configured by a BS. In addition, the third association may be sent to UE in advance. Accordingly, the UE may determine, according to the third association, a fourth numbering corresponding to a combination of a reuse factor ID selected and a reference signal port selected.

A reference signal port and a reuse factor ID may be selected. A fourth numbering $n\_ID_i$ corresponding to a combination of the reference signal port selected and the reuse factor ID selected may be determined. The i may be a numbering of the combination. Then, an initial sequence $c_{init}$, $c_{init}=2^{15} \times n\_ID_i + N_{ID}^{cell}$, acquired by scrambling uplink data to be transmitted, may be determined according to the fourth numbering $n\_ID_i$ and the first numbering $N_{ID}^{cell}$.

There may be a one-to-one correspondence between the second numbering and the reuse factor ID. In some embodiments, each of the second numbering may correspond to a plurality of the reuse factor ID.

There may be a one-to-one correspondence between the second numbering and the reuse factor ID. Then, UE that have selected different reuse factor IDs may scramble uplink data using different second numberings, thereby maximizing a difference between different initial sequences acquired by the UE by scrambling the uplink data, allowing a BS to distinguish the initial sequences acquired by scramble with ease.

One second numbering may correspond to multiple reuse factor IDs. Then, a number of second numberings broadcast by a BS may be reduced. For example, each second numbering may correspond to 5 reuse factor IDs. When there are 20 reuse factor IDs, a BS may have to broadcast but 4 second numberings, thereby reducing resources occupied by BS broadcast.

Note that when one second numbering corresponds to multiple reuse factor IDs, different second numberings may correspond to same numbers of reuse factor IDs, or different numbers of reuse factor IDs.

There may be a one-to-one correspondence between the third numbering and the reference signal port. In some embodiments, each of the third numbering may correspond to a plurality of the reference signal port.

There may be a one-to-one correspondence between the third numbering and the reference signal port. Then, UE that have selected different reference signal ports may scramble uplink data using different third numberings, thereby maximizing a difference between different initial sequences acquired by the UE by scrambling the uplink data, allowing a BS to distinguish the initial sequences acquired by scramble with ease.

One third numbering may correspond to multiple reference signal ports. Then, a number of third numberings broadcast by a BS may be reduced. For example, each third numbering may correspond to 5 reference signal ports. When there are 20 reference signal ports, a BS may have to broadcast but 4 third numberings, thereby reducing resources occupied by BS broadcast.

Note that when one third numbering corresponds to multiple reference signal ports, different third numberings may correspond to same numbers of reference signal ports, or different numbers of reference signal ports.

There may be a one-to-one correspondence between the fourth numbering and the combination. In some embodiments, each of the fourth numbering may correspond to a plurality of the combination.

There may be a one-to-one correspondence between the fourth numbering and a combination of a reuse factor ID and a reference signal port. Then, UE that have selected different reference signal ports or different reuse factor IDs may scramble uplink data using different fourth numberings, thereby maximizing a difference between different initial sequences acquired by the UE by scrambling the uplink data, allowing a BS to distinguish the initial sequences acquired by scramble with ease.

One fourth numbering may correspond to multiple combinations. Then, a number of fourth numberings broadcast by a BS may be reduced. For example, each fourth numbering may correspond to 5 combinations. When there are 20 combinations, a BS may have to broadcast but 4 fourth numberings, thereby reducing resources occupied by BS broadcast.

Note that when one fourth numbering corresponds to multiple combinations, different fourth numberings may correspond to same numbers of combinations, or different numbers of combinations.

Figure 6:
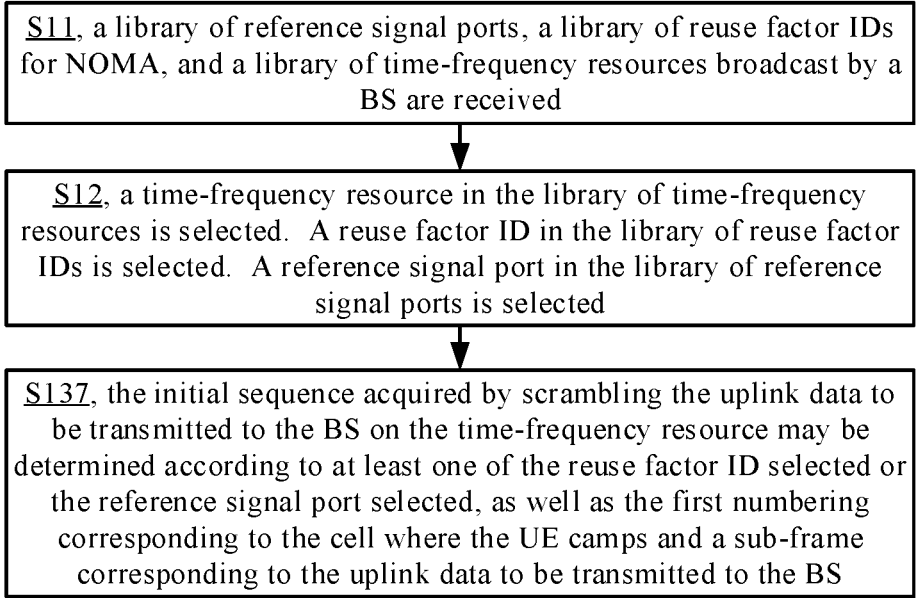
FIG. 6 is a flowchart of a method for determining an initial sequence acquired by scrambling data according to some embodiments of the present disclosure.

FIG. 6 is a flowchart of a method for determining an initial sequence acquired by scrambling data according to some embodiments of the present disclosure.

As shown in FIG. 6, based on the embodiment shown in FIG. 1, the initial sequence acquired by scrambling the uplink data to be transmitted to the BS on the time-frequency resource may be determined according to at least one of the reuse factor ID selected or the reference signal port selected, as well as the first numbering corresponding to the cell where the UE camps, as follows.

In S137, the initial sequence acquired by scrambling the uplink data to be transmitted to the BS on the time-frequency resource may be determined according to at least one of the reuse factor ID selected or the reference signal port selected, as well as the first numbering corresponding to the cell where the UE camps and a sub-frame corresponding to the uplink data to be transmitted to the BS.

An initial sequence acquired by scrambling data may be determined by further considering a sub-frame ns corresponding to the data. In this case, if an initial sequence $c_{init}$ acquired by scrambling uplink data to be transmitted is computed according to a reuse factor ID, the first numbering, and the sub-frame, then $c_{init} = n_{signature} = 2^{14} + \lfloor n_s/2 \rfloor \times 2^9 + N_{ID}^{cell}$. If an initial sequence $c_{init}$ acquired by scrambling uplink data to be transmitted is computed according to a reference signal port, the first numbering, and the sub-frame, then $c_{init} = n_{RS\text{-}port} \times 2^{14} + \lfloor n_s/2 \rfloor \times 2^9 + N_{ID}^{cell}$. If an initial sequence $c_{init}$ acquired by scrambling uplink data to be transmitted is computed according to a reference signal port, a reuse factor ID, the first numbering, and the sub-frame, then $c_{init} = n\_ID_i \times 2^{14} + \lfloor n_s/2 \rfloor \times 2^9 + N_{ID}^{cell}$.

Figure 7:
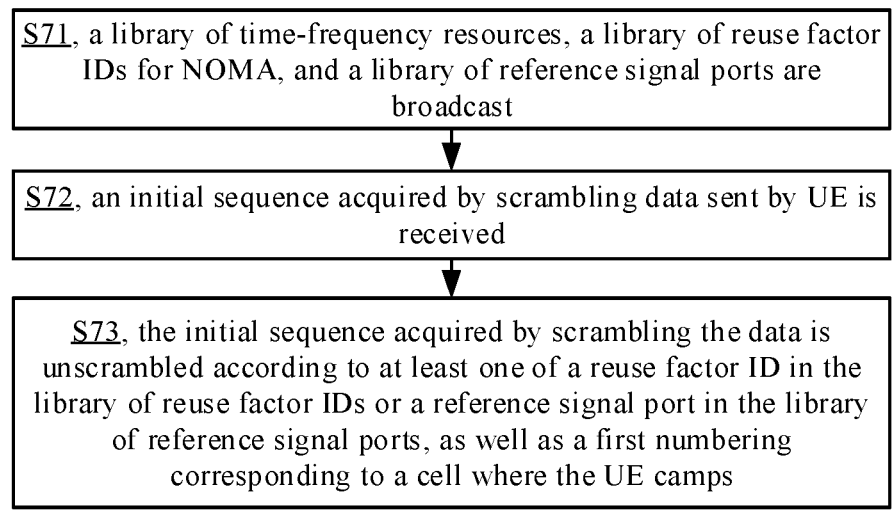
FIG. 7 is a flowchart of a method for unscrambling data according to some embodiments of the present disclosure.

FIG. 7 is a flowchart of a method for unscrambling data according to some embodiments of the present disclosure. The method here may be applied to a BS, such as a 4G BS, a 5G BS, etc.

As shown in FIG. 7, the method for unscrambling data may include a step as follows.

In S71, a library of time-frequency resources, a library of reuse factor IDs for NOMA, and a library of reference signal ports are broadcast.

In S72, an initial sequence acquired by scrambling data sent by UE is received.

In S73, the initial sequence acquired by scrambling the data is unscrambled according to at least one of a reuse factor ID in the library of reuse factor IDs or a reference signal port in the library of reference signal ports, as well as a first numbering corresponding to a cell where the UE camps.

Corresponding to the embodiment as shown in FIG. 1, to allow the UE to perform uplink transmission based on authorization-free uplink scheduling and NOMA, a library of time-frequency resources, a library of reuse factor IDs for NOMA, and a library of reference signal ports may be broadcast. A library of time-frequency resources may include a plurality of time-frequency resources. A library of reuse factor IDs for NOMA may include a plurality of reuse factor IDs for NOMA. A library of reference signal ports may include a plurality of reference signal ports.

UE may determine an initial sequence acquired by scrambling uplink data to be transmitted to the BS on the time-frequency resource according to at least one of the reuse factor ID selected or the reference signal port selected, as well as a first numbering corresponding to a cell where the UE camps. The BS first may extract, from a reused time-frequency resource (based on NOMA) according to reuse factor IDs (such as by trying the reuse factor IDs one by one), an initial sequence acquired by scrambling data transmitted uplink by the UE. Then, the BS may unscramble the initial sequence according to a reuse factor with which the initial sequence is extracted, thereby acquiring the data transmitted uplink by the UE.

Figure 8:
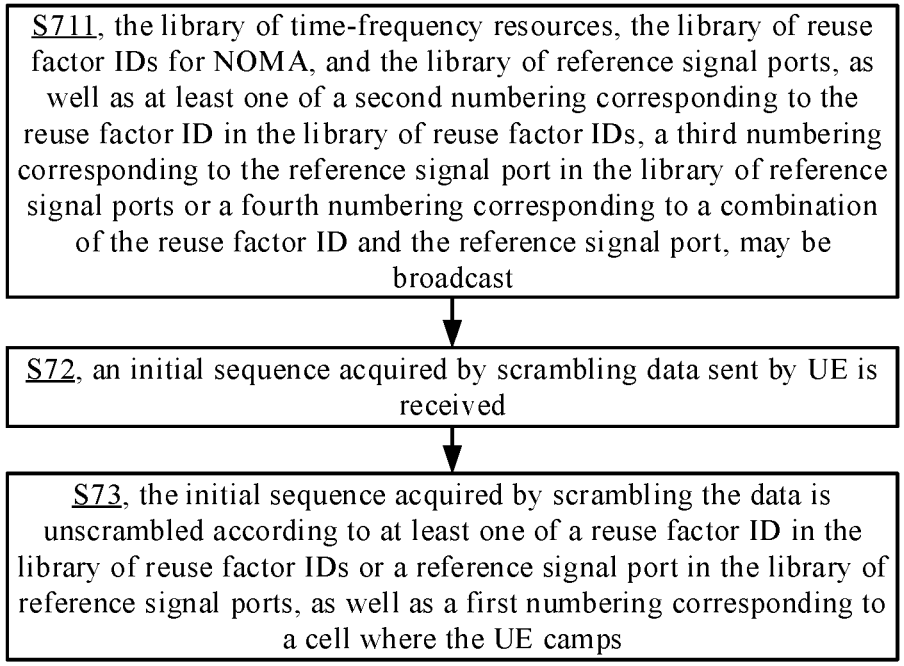
FIG. 8 is a flowchart of broadcasting a library of time-frequency resources, a library of reuse factor identifications (ID) for Non-Orthogonal Multiple Access (NOMA), and a library of reference signal ports according to some embodiments of the present disclosure.

FIG. 8 is a flowchart of broadcasting a library of time-frequency resources, a library of reuse factor identifications (ID) for Non-Orthogonal Multiple Access (NOMA), and a library of reference signal ports according to some embodiments of the present disclosure.

As shown in FIG. 8, based on the embodiment shown in FIG. 7, the library of time-frequency resources, the library of reuse factor IDs for NOMA, and the library of reference signal ports may be broadcast as follows.

In S711, the library of time-frequency resources, the library of reuse factor IDs for NOMA, and the library of reference signal ports, as well as at least one of a second numbering corresponding to the reuse factor ID in the library of reuse factor IDs, a third numbering corresponding to the reference signal port in the library of reference signal ports or a fourth numbering corresponding to a combination of the reuse factor ID and the reference signal port, may be broadcast.

Corresponding to the embodiment as shown in FIG. 2, in addition to the library of time-frequency resources, the library of reuse factor IDs for NOMA, and the library of reference signal ports, the BS may further broadcast at least one of a second numbering corresponding to the reuse factor ID in the library of reuse factor IDs, a third numbering corresponding to the reference signal port in the library of reference signal ports, or a fourth numbering corresponding to a combination of the reuse factor ID and the reference signal port. Accordingly, the UE may compute, according to a numbering, an initial sequence acquired by scrambling data.

Figure 9:
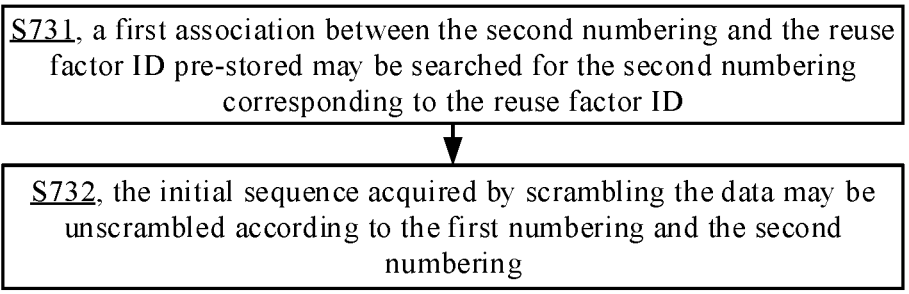
FIG. 9 is a flowchart of unscrambling an initial sequence acquired by scrambling data according to some embodiments of the present disclosure.

FIG. 9 is a flowchart of unscrambling an initial sequence acquired by scrambling data according to some embodiments of the present disclosure.

As shown in FIG. 9, based on the embodiment shown in FIG. 8, in case the second numbering is broadcast, the initial sequence acquired by scrambling the data may be unscrambled according to at least one of the reuse factor ID in the library of reuse factor IDs or the reference signal port in the library of reference signal ports, as well as the first numbering corresponding to the cell where the UE camps, as follows.

In S731, a first association between the second numbering and the reuse factor ID pre-stored may be searched for the second numbering corresponding to the reuse factor ID.

In S732, the initial sequence acquired by scrambling the data may be unscrambled according to the first numbering and the second numbering.

Corresponding to the embodiment as shown in FIG. 3, a BS may configure a first association between a second numbering and a reuse factor ID in advance. Thus, the first association may be searched for a second numbering corresponding to a reuse factor ID with which the initial sequence (acquired by scramble by the UE according to the second numbering and the first numbering) is extracted from a reused time-frequency resource. Accordingly, the initial sequence may be unscrambled according to the first numbering and the second numbering.

Figure 10:
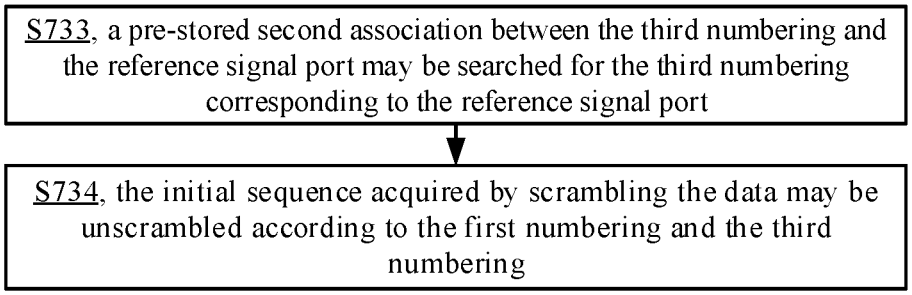
FIG. 10 is a flowchart of unscrambling an initial sequence acquired by scrambling data according to some embodiments of the present disclosure.

FIG. 10 is a flowchart of unscrambling an initial sequence acquired by scrambling data according to some embodiments of the present disclosure.

As shown in FIG. 10, based on the embodiment shown in FIG. 8, in case the third numbering is broadcast, the initial sequence acquired by scrambling the data may be unscrambled according to at least one of the reuse factor ID in the library of reuse factor IDs or the reference signal port in the library of reference signal ports, as well as the first numbering corresponding to the cell where the UE camps, as follows.

In S733, a pre-stored second association between the third numbering and the reference signal port may be searched for the third numbering corresponding to the reference signal port.

In S734, the initial sequence acquired by scrambling the data may be unscrambled according to the first numbering and the third numbering.

Corresponding to the embodiment as shown in FIG. 4, a BS may configure a second association between a third numbering and a reference signal port in advance. Thus, the second association may be searched for a third numbering corresponding to a reference signal port used by the UE. Accordingly, the initial sequence (acquired by scramble by the UE according to the third numbering and the first numbering) may be unscrambled according to the first numbering and the third numbering.

Figure 11:
FIG. 11 is a flowchart of unscrambling an initial sequence acquired by scrambling data according to some embodiments of the present disclosure.

FIG. 11 is a flowchart of unscrambling an initial sequence acquired by scrambling data according to some embodiments of the present disclosure.

As shown in FIG. 11, based on the embodiment shown in FIG. 8, in case the fourth numbering is broadcast, the initial sequence acquired by scrambling the data may be unscrambled according to at least one of the reuse factor ID in the library of reuse factor IDs or the reference signal port in the library of reference signal ports, as well as the first numbering corresponding to the cell where the UE camps, as follows.

In S735, a pre-stored third association between the fourth numbering and the combination may be searched for the fourth numbering corresponding to the combination.

In S736, the initial sequence acquired by scrambling the data may be unscrambled according to the first numbering and the fourth numbering.

Corresponding to the embodiment as shown in FIG. 5, a BS may configure a third association between a fourth numbering and a combination of a reuse factor ID and a reference signal port in advance. Thus, the third association may be searched for a fourth numbering corresponding to a combination of a reference signal port used by the UE and a reuse factor ID with which the initial sequence (acquired by scramble by the UE according to the fourth numbering and the first numbering) is extracted from a reused time-frequency resource. Accordingly, the initial sequence may be unscrambled according to the first numbering and the fourth numbering.

Figure 12:
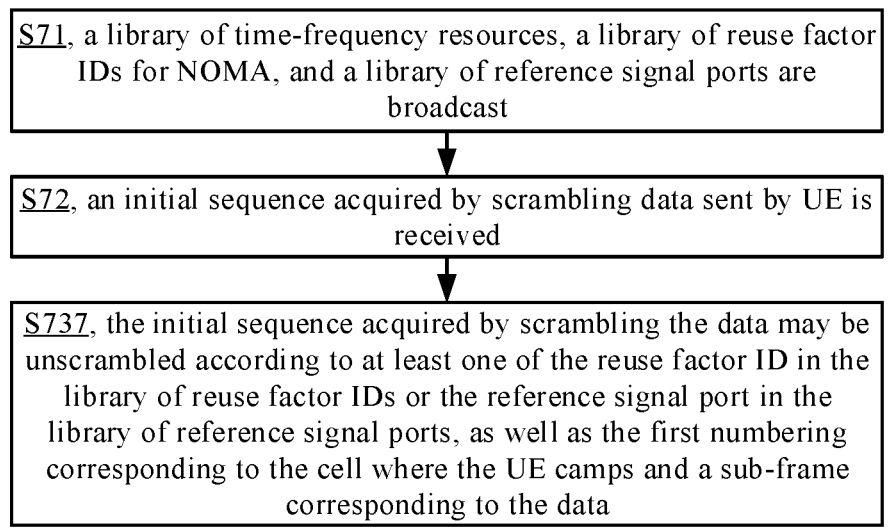
FIG. 12 is a flowchart of a method for unscrambling data according to some embodiments of the present disclosure.

FIG. 12 is a flowchart of a method for unscrambling data according to some embodiments of the present disclosure.

As shown in FIG. 12, based on the embodiment shown in FIG. 7, the initial sequence acquired by scrambling the data may be unscrambled according to at least one of the reuse factor ID in the library of reuse factor IDs or the reference signal port in the library of reference signal ports, as well as the first numbering corresponding to the cell where the UE camps, as follows.

In S737, the initial sequence acquired by scrambling the data may be unscrambled according to at least one of the reuse factor ID in the library of reuse factor IDs or the reference signal port in the library of reference signal ports, as well as the first numbering corresponding to the cell where the UE camps and a sub-frame corresponding to the data.

Corresponding to the embodiment as shown in FIG. 6, the UE may further perform scramble using a sub-frame. Accordingly, the BS may perform unscramble according to the sub-frame.

Corresponding to embodiments relating to an aforementioned method for determining an initial sequence acquired by scrambling data and an aforementioned method for unscrambling data, embodiments herein further provide embodiments relating to a device for determining an initial sequence acquired by scrambling data and a device for unscrambling data.

Figure 13:
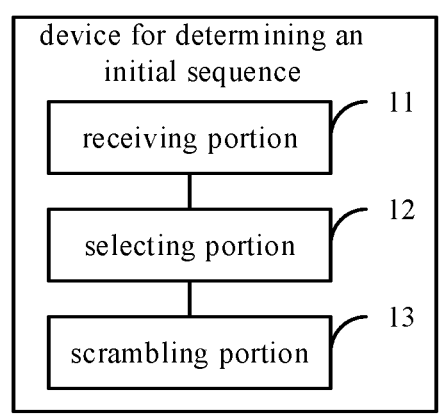
FIG. 13 is a block diagram of a device for determining an initial sequence acquired by scrambling data according to some embodiments of the present disclosure.

FIG. 13 is a block diagram of a device for determining an initial sequence acquired by scrambling data according to some embodiments of the present disclosure.

As shown in FIG. 13, the device includes a receiving portion, a selecting portion, and a scrambling portion.

The receiving portion 11 may be adapted to receiving a library of reference signal ports, a library of reuse factor identifications (ID) for Non-Orthogonal Multiple Access (NOMA), and a library of time-frequency resources broadcast by a base station (BS).

The selecting portion 12 may be adapted to selecting a time-frequency resource in the library of time-frequency resources, selecting a reuse factor ID in the library of reuse factor IDs, and selecting a reference signal port in the library of reference signal ports.

The scrambling portion 13 may be adapted to determining, according to at least one of the reuse factor ID selected or the reference signal port selected, as well as a first numbering corresponding to a cell where the UE camps, an initial sequence acquired by scrambling uplink data to be transmitted to a BS on a time-frequency resource.

The receiving portion may be adapted to receiving at least one of a second numbering corresponding to a reuse factor ID in the library of reuse factor IDs, a third numbering corresponding to a reference signal port in the library of reference signal ports or a fourth numbering corresponding to a combination of the reuse factor ID and the reference signal port, as well as the library of reference signal ports, the library of reuse factor IDs for NOMA, and the library of time-frequency resources broadcast by the BS.

Figure 14:
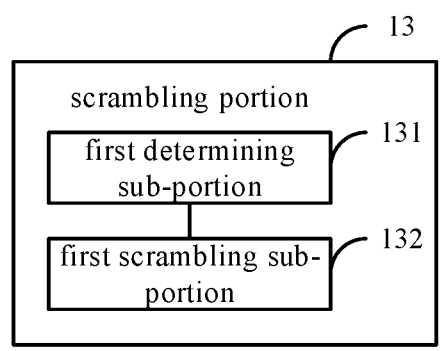
FIG. 14 is a block diagram of a scrambling portion according to some embodiments of the present disclosure.

FIG. 14 is a block diagram of a scrambling portion according to some embodiments of the present disclosure.

As shown in FIG. 14, based on the embodiment shown in FIG. 13, in case the second numbering is received, the scrambling portion 13 may include a first determining sub-portion and a first scrambling sub-portion.

The first determining sub-portion 131 may be adapted to determining a second numbering corresponding to the reuse factor ID selected.

The first scrambling sub-portion 132 may be adapted to determining, according to the first numbering and the second numbering corresponding to the reuse factor ID selected, the initial sequence acquired by scrambling the uplink data to be transmitted to the BS on the time-frequency resource.

Figure 15:
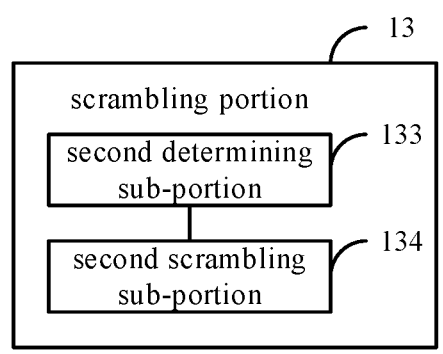
FIG. 15 is a block diagram of a scrambling portion according to some embodiments of the present disclosure.

FIG. 15 is a block diagram of a scrambling portion according to some embodiments of the present disclosure.

As shown in FIG. 15, based on the embodiment shown in FIG. 13, in case the third numbering is received, the scrambling portion 13 may include a second determining sub-portion and a second scrambling sub-portion.

The second determining sub-portion 133 may be adapted to determining a third numbering corresponding to the reference signal port selected.

The second scrambling sub-portion 134 may be adapted to determining, according to the first numbering and the third numbering corresponding to the reference signal port selected, the initial sequence acquired by scrambling the uplink data to be transmitted to the BS on the time-frequency resource.

Figure 16:
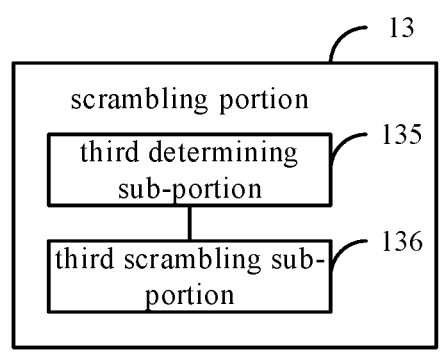
FIG. 16 is a block diagram of a scrambling portion according to some embodiments of the present disclosure.

FIG. 16 is a block diagram of a scrambling portion according to some embodiments of the present disclosure.

As shown in FIG. 16, based on the embodiment shown in FIG. 13, in case the fourth numbering is received, the scrambling portion 13 may include a third determining sub-portion and a third scrambling sub-portion.

The third determining sub-portion 135 may be adapted to determining a fourth numbering corresponding to the combination of the reuse factor ID selected and the reference signal port selected.

The third scrambling sub-portion 136 may be adapted to determining, according to the first numbering and the fourth numbering corresponding to the combination of the reuse factor ID selected and the reference signal port selected, the initial sequence acquired by scrambling the uplink data to be transmitted to the BS on the time-frequency resource.

There may be a one-to-one correspondence between the second numbering and the reuse factor ID. In some embodiments, each of the second numbering may correspond to a plurality of the reuse factor ID.

There may be a one-to-one correspondence between the third numbering and the reference signal port. In some embodiments, each of the third numbering may correspond to a plurality of the reference signal port.

There may be a one-to-one correspondence between the fourth numbering and the combination. In some embodiments, each of the fourth numbering may correspond to a plurality of the combination.

The scrambling portion may be adapted to determining, according to at least one of the reuse factor ID selected or the reference signal port selected, as well as the first numbering corresponding to the cell where the UE camps and a sub-frame corresponding to the uplink data to be transmitted to the BS, the initial sequence acquired by scrambling the uplink data to be transmitted to the BS on the time-frequency resource.

Figure 17:
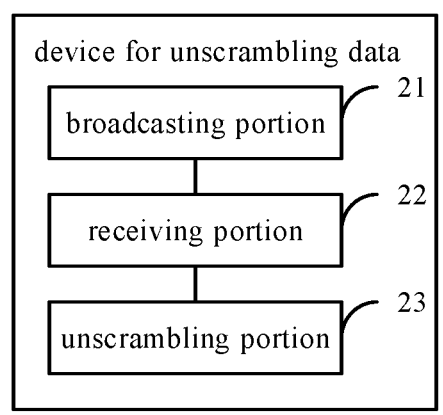
FIG. 17 is a block diagram of a device for unscrambling data according to some embodiments of the present disclosure.

FIG. 17 is a block diagram of a device for unscrambling data according to some embodiments of the present disclosure. Here the device may be applied to a BS.

As shown in FIG. 17, the device for unscrambling data includes a broadcasting portion, a receiving portion, and an unscrambling portion.

The broadcasting portion 21 may be adapted to broadcasting a library of time-frequency resources, a library of reuse factor identifications (ID) for Non-Orthogonal Multiple Access (NOMA), and a library of reference signal ports.

The receiving portion 22 may be adapted to receiving an initial sequence acquired by scrambling data sent by User Equipment (UE).

The unscrambling portion 23 may be adapted to unscrambling, according to at least one of a reuse factor ID in the library of reuse factor IDs or a reference signal port in the library of reference signal ports, as well as a first numbering corresponding to a cell where the UE camps, an initial sequence acquired by scrambling data.

The broadcasting portion may be adapted to broadcasting the library of time-frequency resources, the library of reuse factor IDs for NOMA, and the library of reference signal ports, as well as at least one of a second numbering corresponding to the reuse factor ID in the library of reuse factor IDs, a third numbering corresponding to the reference signal port in the library of reference signal ports or a fourth numbering corresponding to a combination of the reuse factor ID and the reference signal port.

Figure 18:
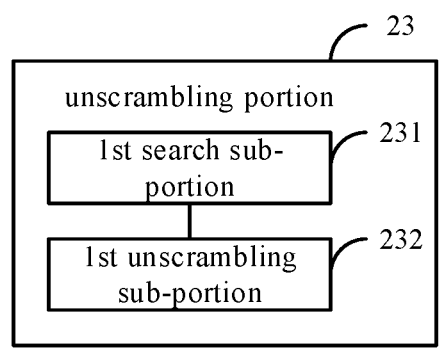
FIG. 18 is a block diagram of an unscrambling portion according to some embodiments of the present disclosure.

FIG. 18 is a block diagram of an unscrambling portion according to some embodiments of the present disclosure.

As shown in FIG. 18, based on the embodiment shown in FIG. 17, in case the second numbering is broadcast, the unscrambling portion 23 may include a first search sub-portion and a first unscrambling sub-portion.

The first search sub-portion 231 may be adapted to searching a first association between the second numbering and the reuse factor ID pre-stored for the second numbering corresponding to the reuse factor ID.

The first unscrambling sub-portion 232 may be adapted to unscrambling, according to the first numbering and the second numbering, the initial sequence acquired by scrambling the data.

Figure 19:
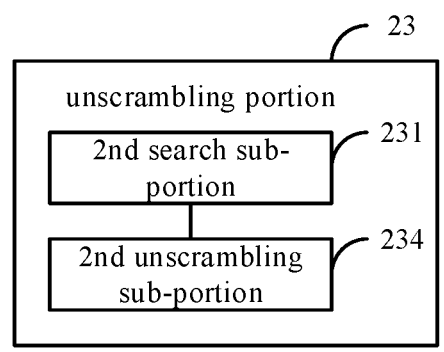
FIG. 19 is a block diagram of an unscrambling portion according to some embodiments of the present disclosure.

FIG. 19 is a block diagram of an unscrambling portion according to some embodiments of the present disclosure.

As shown in FIG. 19, based on the embodiment shown in FIG. 17, in case the third numbering is broadcast, the unscrambling portion 23 may include a second search sub-portion and a second unscrambling sub-portion.

The second search sub-portion 233 may be adapted to searching a second association between the third numbering and the reference signal port pre-stored for the third numbering corresponding to the reference signal port;

The second unscrambling sub-portion 234 may be adapted to unscrambling, according to the first numbering and the third numbering, the initial sequence acquired by scrambling the data.

Figure 20:
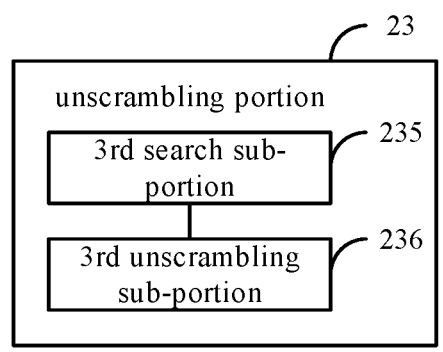
FIG. 20 is a block diagram of an unscrambling portion according to some embodiments of the present disclosure.

FIG. 20 is a block diagram of an unscrambling portion according to some embodiments of the present disclosure.

As shown in FIG. 20, based on the embodiment shown in FIG. 17, in case the fourth numbering is broadcast, the unscrambling portion 23 may including a third search sub-portion and a third unscrambling sub-portion.

The third search sub-portion 235 may be adapted to searching a third association between the fourth numbering and the combination pre-stored for the fourth numbering corresponding to the combination.

The third unscrambling sub-portion 236 may be adapted to unscrambling, according to the first numbering and the fourth numbering, the initial sequence acquired by scrambling the data.

The unscrambling portion may be adapted to unscrambling the initial sequence acquired by scrambling the data according to at least one of the reuse factor ID in the library of reuse factor IDs or the reference signal port in the library of reference signal ports, as well as the first numbering corresponding to the cell where the UE camps and a sub-frame corresponding to the data.

According to some embodiments of the present disclosure, electronic equipment includes a processor and memory.

The memory is adapted to storing an instruction executable by the processor.

The processor is adapted to implementing a step of a method for determining an initial sequence acquired by scrambling data according to any embodiment herein.

According to some embodiments of the present disclosure, electronic equipment includes a processor and memory.

The memory is adapted to storing an instruction executable by the processor.

The processor is adapted to implementing a step of a method for unscrambling data according to any embodiment herein.

According to some embodiments of the present disclosure, a computer-readable storage medium has stored thereon a computer program which, when executed by a processor, implements a step of a method for determining an initial sequence acquired by scrambling data according to any aforementioned embodiment herein.

According to some embodiments of the present disclosure, a computer-readable storage medium has stored thereon a computer program which, when executed by a processor, implements a step of a method for unscrambling data according to any aforementioned embodiment herein.

Figure 21:
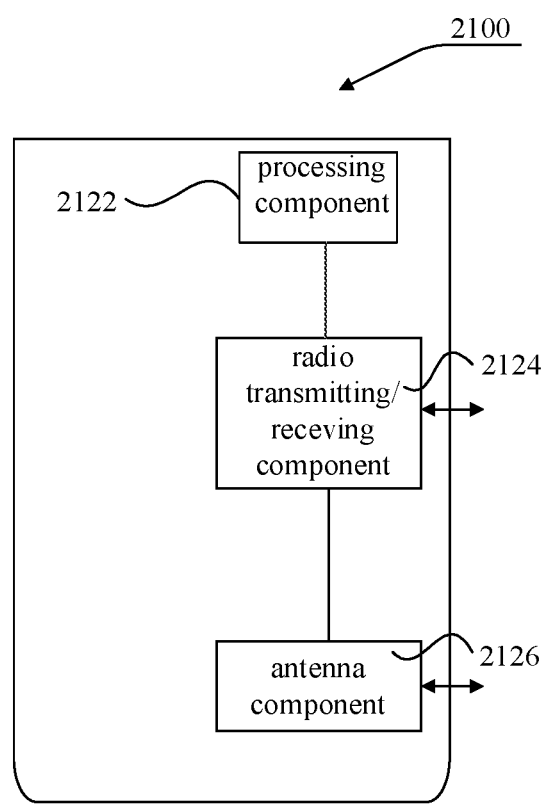
FIG. 21 is a block diagram of a device for unscrambling data according to some embodiments of the present disclosure.

FIG. 21 is a block diagram of a device 2100 for unscrambling data according to some embodiments of the present disclosure. As shown in FIG. 21, the device 2100 may be provided as a base station. Referring to FIG. 21, the device 2100 includes a processing component 2122, a radio transmitting/receiving component 2124, an antenna component 2126, and a signal processing part dedicated to a radio interface. The processing component 2122 may further include one or more processors. A processor of the processing component 2122 may be adapted to implementing a step of a method for unscrambling data according to any aforementioned embodiment herein.

Figure 22:
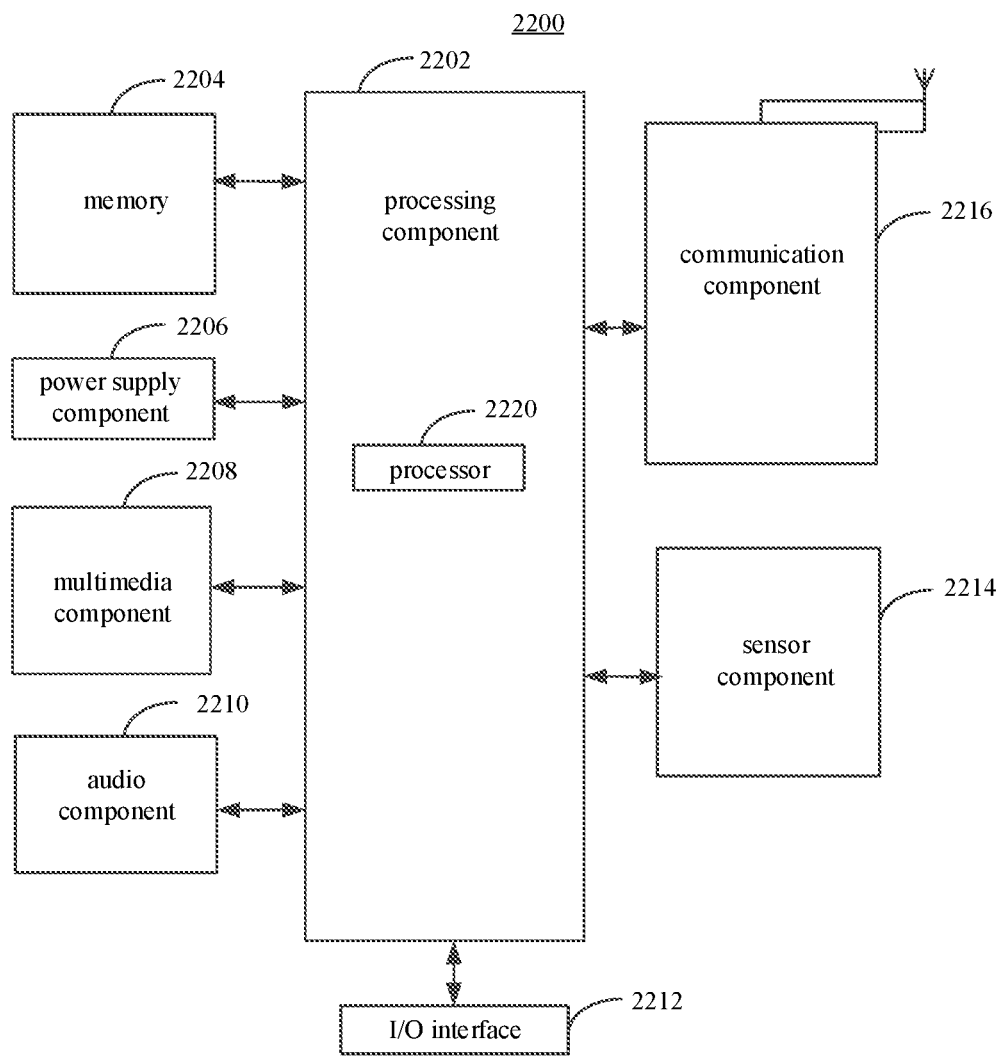
FIG. 22 is a block diagram of a device for determining an initial sequence acquired by scrambling data according to some embodiments of the present disclosure.

FIG. 22 is a block diagram of a device 2200 for determining an initial sequence acquired by scrambling data according to some embodiments of the present disclosure. For example, the device 2200 may be UE such as a mobile phone, a computer, a digital broadcast terminal, messaging equipment, a gaming console, tablet equipment, medical equipment, exercise equipment, a personal digital assistant, etc.

Referring to FIG. 22, the device 2200 may include at least one of a processing component 2202, memory 2204, a power supply component 2206, a multimedia component 2208, an audio component 2210, an Input/Output (I/O) interface 2212, a sensor component 2214, a communication component 2216, etc.

The processing component 2202 may generally control an overall operation of the device 2200, such as operations associated with display, a telephone call, data communication, a camera operation, a recording operation, etc. The processing component 2202 may include one or more processors 2220 to execute instructions so as to complete all or a part of an aforementioned method. In addition, the processing component 2202 may include one or more portions to facilitate interaction between the processing component 2202 and other components. For example, the processing component 2202 may include a multimedia portion to facilitate interaction between the multimedia component 2208 and the processing component 2202.

The memory 2204 may be adapted to storing various types of data to support the operation at the device 2200. Examples of such data may include instructions of any application or method adapted to operating on the device 2200, contact data, phonebook data, messages, pictures, videos, etc. The memory 2204 may be realized by any type of transitory or non-transitory storage equipment or a combination thereof, such as Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, a magnetic disk, a compact disk, etc.

The power supply component 2206 may supply electric power to various components of the device 2200. The power supply component 2206 may include a power management system, one or more power sources, and other components related to generating, managing, and distributing electricity for the device 2200.

The multimedia component 2208 may include a screen that provides an output interface between the device 2200 and a user. The screen may include a Liquid Crystal Display (LCD), a Touch Panel (TP), etc. In some embodiments, organic light-emitting diode (OLED) or other types of displays can be employed.

If the screen includes a TP, the screen may be realized as a touch screen to receive a signal input by a user. The TP may include one or more touch sensors for sensing touch, slide, and gestures on the TP. The one or more touch sensors not only may sense the boundary of a touch or slide move, but also detect the duration and pressure related to the touch or slide move. The multimedia component 2208 may include at least one of a front camera or a rear camera. When the device 2200 is in an operation mode such as a photographing mode or a video mode, at least one of the front camera or the rear camera may receive external multimedia data. Each of the front camera or the rear camera may be a fixed optical lens system or may have a focal length and be capable of optical zooming.

The audio component 2210 may be adapted to outputting and/or inputting an audio signal. For example, the audio component 2210 may include a microphone (MIC). When the device 2200 is in an operation mode such as a call mode, a recording mode, a voice recognition mode, etc., the MIC may be adapted to receiving an external audio signal. The received audio signal may be further stored in the memory 2204 or may be sent via the communication component 2216. The audio component 2210 may further include a loudspeaker adapted to outputting the audio signal.

The I/O interface 2212 may provide an interface between the processing component 2202 and a peripheral interface portion. Such a peripheral interface portion may be a keypad, a click wheel, a button, etc. Such a button may include but is not limited to at least one of a homepage button, a volume button, a start button, or a lock button.

The sensor component 2214 may include one or more sensors for assessing various states of the device 2200. For example, the sensor component 2214 may detect an on/off state of the device 2200 and relative positioning of components such as the display and the keypad of the device 2200. The sensor component 2214 may further detect a change in the position of the device 2200 or of a component of the device 2200, whether there is contact between the device 2200 and a user, the orientation or acceleration/deceleration of the device 2200, a change in the temperature of the device 2200, etc. The sensor component 2214 may include a proximity sensor adapted to detecting existence of a nearby object without physical contact. The sensor component 2214 may further include an optical sensor such as a Complementary Metal-Oxide-Semiconductor (CMOS) or a Charge-Coupled-Device (CCD) image sensor used in an imaging application. The sensor component 2214 may further include an acceleration sensor, a gyroscope sensor, a magnetic sensor, a pressure sensor, a temperature sensor, etc.

The communication component 2216 may be adapted to facilitating wired or wireless communication between the device 2200 and other equipment. The device 2200 may access a wireless network based on a communication standard such as Wi-Fi, 2G, 3G . . . , or a combination thereof. The communication component 2216 may broadcast related information or receive a broadcast signal from an external broadcast management system via a broadcast channel. The communication component 2216 may include a Near Field Communication (NFC) portion for short-range communication. For example, the NFC portion may be based on technology such as Radio Frequency Identification (RFID), Infrared Data Association (IrDA), Ultra-Wideband (UWB) technology, Bluetooth (BT), etc.

The device 2200 may be realized by one or more electronic components such as an Application Specific Integrated Circuit (ASIC), a Digital Signal Processor (DSP), a Digital Signal Processing Device (DSPD), a Programmable Logic Device (PLD), a Field Programmable Gate Array (FPGA), a controller, a microcontroller, a microprocessor, etc., to implement a step of a method for determining an initial sequence acquired by scrambling data according to any aforementioned embodiment herein.

A non-transitory computer-readable storage medium including instructions, such as memory 2204 including instructions, may be provided. The instructions may be executed by the processor 2220 of the device 2200 to implement an aforementioned method. For example, the non-transitory computer-readable storage medium may be Read-Only Memory (ROM), Compact Disc Read-Only Memory (CD-ROM), a magnetic tape, a floppy disk, optical data storage equipment, etc.

The various device components, portions, units, modules, circuits, blocks, or portions may have modular configurations, or are composed of discrete components, but nonetheless can be referred to as "modules" or "portions" in general. In other words, the "components," "portions," "units," "modules," "circuits," "blocks," or "portions" referred to herein may or may not be in modular forms, and these phrases may be interchangeably used.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

In some embodiments, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

What is claimed is:

1. A method for determining an initial sequence acquired by scrambling data, applicable to User Equipment (UE), the method comprising:
    receiving a library of reference signal ports, a library of reuse factor identifications (ID) for Non-Orthogonal Multiple Access (NOMA), and a library of time-frequency resources broadcast by a base station (BS);
    selecting a time-frequency resource in the library of time-frequency resources, selecting a reuse factor ID in the library of reuse factor IDs, and selecting a reference signal port in the library of reference signal ports; and
    determining, according to at least one of the reuse factor ID selected or the reference signal port selected, as well as a first numbering corresponding to a cell where the UE camps, an initial sequence acquired by scrambling uplink data to be transmitted to the BS on the time-frequency resource.

2. The method of claim 1, wherein the receiving the library of reference signal ports, the library of reuse factor IDs for NOMA, and the library of time-frequency resources broadcast by the BS comprises:
    receiving at least one of a second numbering corresponding to a reuse factor ID in the library of reuse factor IDs, a third numbering corresponding to a reference signal port in the library of reference signal ports or a fourth numbering corresponding to a combination of the reuse factor ID and the reference signal port, as well as the library of reference signal ports, the library of reuse factor IDs for NOMA, and the library of time-frequency resources broadcast by the BS.

3. The method of claim 2, wherein the determining, according to at least one of the reuse factor ID selected or the reference signal port selected, as well as the first numbering corresponding to the cell where the UE camps, the initial sequence acquired by scrambling the uplink data to be transmitted to the BS on the time-frequency resource comprises: in response to receiving the second numbering,
    determining a second numbering corresponding to the reuse factor ID selected;
    determining, according to the first numbering and the second numbering corresponding to the reuse factor ID selected, the initial sequence acquired by scrambling the uplink data to be transmitted to the BS on the time-frequency resource.

4. The method of claim 2, wherein the determining, according to at least one of the reuse factor ID selected or the reference signal port selected, as well as the first numbering corresponding to the cell where the UE camps, the initial sequence acquired by scrambling the uplink data to be transmitted to the BS on the time-frequency resource comprises: in response to receiving the third numbering,
    determining a third numbering corresponding to the reference signal port selected;
    determining, according to the first numbering and the third numbering corresponding to the reference signal port selected, the initial sequence acquired by scrambling the uplink data to be transmitted to the BS on the time-frequency resource.

5. The method of claim 2, wherein the determining, according to at least one of the reuse factor ID selected or the reference signal port selected, as well as the first numbering corresponding to the cell where the UE camps, the initial sequence acquired by scrambling the uplink data to be transmitted to the BS on the time-frequency resource comprises: in response to receiving the fourth numbering,
    determining a fourth numbering corresponding to the combination of the reuse factor ID selected and the reference signal port selected;
    determining, according to the first numbering and the fourth numbering corresponding to the combination of the reuse factor ID selected and the reference signal port selected, the initial sequence acquired by scrambling the uplink data to be transmitted to the BS on the time-frequency resource.

6. The method of claim 2, wherein there is a one-to-one correspondence between the second numbering and the reuse factor ID, or each of the second numbering corresponds to a plurality of the reuse factor ID.

7. The method of claim 2, wherein there is a one-to-one correspondence between the third numbering and the reference signal port, or each of the third numbering corresponds to a plurality of the reference signal port.

8. The method of claim 2, wherein there is a one-to-one correspondence between the fourth numbering and the combination, or each of the fourth numbering corresponds to a plurality of the combination.

9. The method of claim 1, wherein the determining, according to at least one of the reuse factor ID selected or the reference signal port selected, as well as the first numbering corresponding to the cell where the UE camps, the initial sequence acquired by scrambling the uplink data to be transmitted to the BS on the time-frequency resource comprises:
    determining, according to at least one of the reuse factor ID selected or the reference signal port selected, as well as the first numbering corresponding to the cell where the UE camps and a sub-frame corresponding to the uplink data to be transmitted to the BS, the initial sequence acquired by scrambling the uplink data to be transmitted to the BS on the time-frequency resource.

10. A method for unscrambling data, comprising:
broadcasting a library of time-frequency resources, a library of reuse factor identifications (ID) for Non-Orthogonal Multiple Access (NOMA), and a library of reference signal ports;
receiving an initial sequence acquired by scrambling data sent by User Equipment (UE); and
unscrambling, according to at least one of a reuse factor ID in the library of reuse factor IDs or a reference signal port in the library of reference signal ports, as well as a first numbering corresponding to a cell where the UE camps, the initial sequence acquired by scrambling the data.

11. The method of claim 10, wherein the broadcasting the library of time-frequency resources, the library of reuse factor IDs for NOMA, and the library of reference signal ports comprises:
broadcasting the library of time-frequency resources, the library of reuse factor IDs for NOMA, and the library of reference signal ports, as well as at least one of a second numbering corresponding to the reuse factor ID in the library of reuse factor IDs, a third numbering corresponding to the reference signal port in the library of reference signal ports or a fourth numbering corresponding to a combination of the reuse factor ID and the reference signal port.

12. The method of claim 11, wherein the unscrambling, according to at least one of the reuse factor ID in the library of reuse factor IDs or the reference signal port in the library of reference signal ports, as well as the first numbering corresponding to the cell where the UE camps, the initial sequence acquired by scrambling the data comprises: in response to the second numbering being broadcast,
searching a first association between the second numbering and the reuse factor ID pre-stored for the second numbering corresponding to the reuse factor ID;
unscrambling, according to the first numbering and the second numbering, the initial sequence acquired by scrambling the data.

13. The method of claim 11, wherein the unscrambling, according to at least one of the reuse factor ID in the library of reuse factor IDs or the reference signal port in the library of reference signal ports, as well as the first numbering corresponding to the cell where the UE camps, the initial sequence acquired by scrambling the data comprises: in response to the third numbering being broadcast,
searching a second association between the third numbering and the reference signal port pre-stored for the third numbering corresponding to the reference signal port;
unscrambling, according to the first numbering and the third numbering, the initial sequence acquired by scrambling the data.

14. The method of claim 11, wherein the unscrambling, according to at least one of the reuse factor ID in the library of reuse factor IDs or the reference signal port in the library of reference signal ports, as well as the first numbering corresponding to the cell where the UE camps, the initial sequence acquired by scrambling the data comprises: in response to the fourth numbering being broadcast,
searching a third association between the fourth numbering and the combination pre-stored for the fourth numbering corresponding to the combination;
unscrambling, according to the first numbering and the fourth numbering, the initial sequence acquired by scrambling the data.

15. The method of claim 10, wherein the unscrambling, according to at least one of the reuse factor ID in the library of reuse factor IDs or the reference signal port in the library of reference signal ports, as well as the first numbering corresponding to the cell where the UE camps, the initial sequence acquired by scrambling the data comprises:
unscrambling the initial sequence acquired by scrambling the data according to at least one of the reuse factor ID in the library of reuse factor IDs or the reference signal port in the library of reference signal ports, as well as the first numbering corresponding to the cell where the UE camps and a sub-frame corresponding to the data.

16. User Equipment (UE), comprising a processor and memory,
wherein the memory is adapted to storing an instruction executable by the processor,
wherein the processor is adapted to performing:
receiving a library of reference signal ports, a library of reuse factor identifications (ID) for Non-Orthogonal Multiple Access (NOMA), and a library of time-frequency resources broadcast by a base station (BS);
selecting a time-frequency resource in the library of time-frequency resources, selecting a reuse factor ID in the library of reuse factor IDs, and selecting a reference signal port in the library of reference signal ports; and
determining, according to at least one of the reuse factor ID selected or the reference signal port selected, as well as a first numbering corresponding to a cell where the UE camps, an initial sequence acquired by scrambling uplink data to be transmitted to the BS on the time-frequency resource.

17. The UE of claim 16, wherein the processor is adapted to perform receiving the library of reference signal ports, the library of reuse factor IDs for NOMA, and the library of time-frequency resources broadcast by the BS by:
receiving at least one of a second numbering corresponding to a reuse factor ID in the library of reuse factor IDs, a third numbering corresponding to a reference signal port in the library of reference signal ports or a fourth numbering corresponding to a combination of the reuse factor ID and the reference signal port, as well as the library of reference signal ports, the library of reuse factor IDs for NOMA, and the library of time-frequency resources broadcast by the BS.

18. The UE of claim 17, wherein the processor is adapted to perform determining, according to at least one of the reuse factor ID selected or the reference signal port selected, as well as the first numbering corresponding to the cell where the UE camps, the initial sequence acquired by scrambling the uplink data to be transmitted to the BS on the time-frequency resource by: in response to receiving the second numbering,
determining a second numbering corresponding to the reuse factor ID selected;
determining, according to the first numbering and the second numbering corresponding to the reuse factor ID selected, the initial sequence acquired by scrambling the uplink data to be transmitted to the BS on the time-frequency resource.

19. The UE of claim 17, wherein the processor is adapted to determining, according to at least one of the reuse factor ID selected or the reference signal port selected, as well as the first numbering corresponding to the cell where the UE camps, the initial sequence acquired by scrambling the uplink data to be transmitted to the BS on the time-frequency resource by: in response to receiving the third numbering,
  determining a third numbering corresponding to the reference signal port selected;
  determining, according to the first numbering and the third numbering corresponding to the reference signal port selected, the initial sequence acquired by scrambling the uplink data to be transmitted to the BS on the time-frequency resource.

20. A communication system implementing the method according to claim 1, comprising the UE and the BS, wherein the UE is configured to:
  obtain the reuse factor ID and the reference signal port to learn the first numbering corresponding to the cell where the UE camps upon accessing the cell; and
  determine the initial sequence acquired by scrambling data according to at least one of the reuse factor ID and the reference signal port, and the first numbering, such that the initial sequence acquired by scrambling the data is determined successfully for implementing uplink data scrambling even without Radio Network Temporary Identifier (RNTI) being acquired; and the BS is configured to:
  broadcast the library of time-frequency resources, the library of reuse factor ID for NOMA) and the library of reference signal ports;
  receive the initial sequence acquired by scrambling data sent by the UE; and
  unscramble, according to at least one of the reuse factor ID in the library of reuse factor IDs and the reference signal port in the library of reference signal ports, and the first numbering corresponding to the cell where the UE camps, the initial sequence acquired by scrambling the data.

\* \* \* \* \*